United States Patent [19]

Rowland et al.

[11] Patent Number: 5,513,292
[45] Date of Patent: Apr. 30, 1996

[54] OVERHEAD OPTICAL TRANSMISSION SYSTEM

[75] Inventors: Simon M. Rowland, Tarporley; Ian G. Knight, Westminster Park, both of England

[73] Assignee: BICC Public Ltd. Co., London, England

[21] Appl. No.: 318,844

[22] PCT Filed: May 7, 1993

[86] PCT No.: PCT/GB93/00947

§ 371 Date: Oct. 25, 1994

§ 102(e) Date: Oct. 25, 1994

[87] PCT Pub. No.: WO93/23779

PCT Pub. Date: Nov. 25, 1993

[30] Foreign Application Priority Data

May 9, 1992 [GB] United Kingdom ............ 9210063

[51] Int. Cl.⁶ ............................................. G02B 6/48
[52] U.S. Cl. ................................... 385/100; 385/101
[58] Field of Search ............................. 385/100–114

[56] References Cited

U.S. PATENT DOCUMENTS

| | | | |
|---|---|---|---|
| 4,776,665 | 10/1988 | Oestreich | 385/101 X |
| 5,291,573 | 3/1994 | Yoshida et al. | 385/103 |
| 5,317,665 | 5/1994 | Herrebrugh | 385/101 |
| 5,325,457 | 6/1994 | Bottoms, Jr. et al. | 385/113 |

FOREIGN PATENT DOCUMENTS

| | | | |
|---|---|---|---|
| 0403285 | 12/1990 | European Pat. Off. | 385/100 |
| 0410735 | 1/1991 | European Pat. Off. | 385/100 |
| 2236197 | 3/1991 | United Kingdom | 385/100 |
| 2240189 | 7/1991 | United Kingdom | 385/101 |

OTHER PUBLICATIONS

"The development of Wrap-on Optical cables for use on the earthwires of high voltage power lines" Carter et al. Central Electric Research Lab. pp. 1–6 Aug. 1988.

*Primary Examiner*—John D. Lee
*Assistant Examiner*—Phan T. H. Palmer
*Attorney, Agent, or Firm*—Nath & Assocs.; Gary M. Nath; Anthony D. Miller

[57] ABSTRACT

A method of installing an optical cable in an overhead power transmission line by supporting an optical cable, which has an overall protective sheath of electrically insulating material, in long lengths between towers employed to support at least one electric power transmission line which is on load and, after the optical cable has been so installed and while the overhead electric power transmission line is on load, providing on or in the supported optical cable at least one longitudinally continuous path which extends throughout substantially the whole length of the supported optical cable and which is sufficiently electrically conductive to carry along the cable any currents that may be capacitively induced. The method enables a cable that will not be subject to dry-band arcing to be installed without danger to personnel during installation.

26 Claims, 3 Drawing Sheets

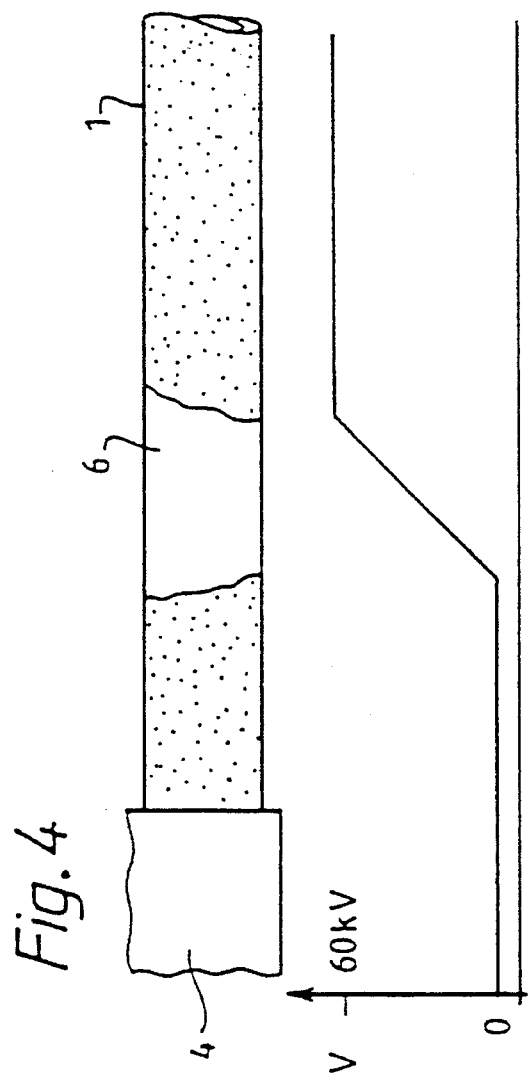
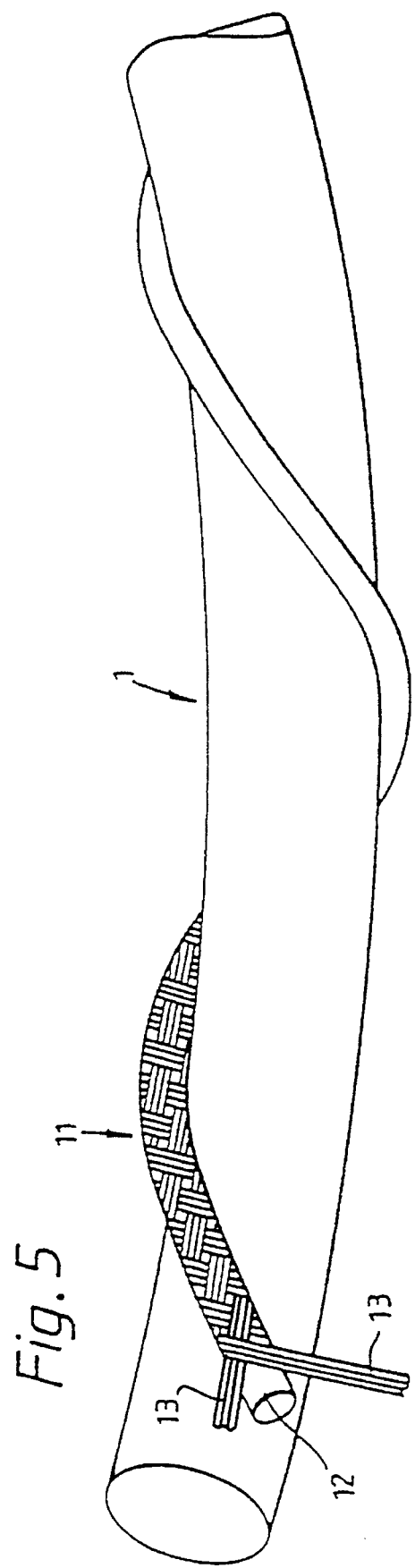
Fig. 4
Fig. 5

OVERHEAD OPTICAL TRANSMISSION SYSTEM

This invention relates to optical cables for use in optical transmission systems, and especially to cables for use in overhead optical transmission systems in which the cable is supported along the route of the system by means of towers, masts or other upstanding supports that are also employed to support electrical power cables.

In systems of this kind it is the general practice to earth the optical cable or cables at the towers, masts or other supports (hereinafter simply referred to as towers). When the electrical power lines are on load, electrical currents may be capacitively induced on the optical cable due to the distributed capacitance between the cable and the power lines. The voltage induced on the optical cable will reach a maximum at mid span between the towers, while the current flowing along the cable will be greatest in the region of the towers. Under dry conditions the induced currents will be relatively small due to the relatively high longitudinal resistance of the cable, e.g. in the region of $10^{12}$ Ohm $m^{-1}$ but under wet conditions when the surface resistance of the cable is much lower, e.g. in the region of 10M Ohm $m^{-1}$, much higher currents will be induced. Joule heating of the cable surface by the induced currents can cause a short length of the cable surface to become dry, usually in the region of a tower where the current is highest. When this happens the major part of the induced voltage on the cable is dropped across the short dry band due to its high longitudinal resistance, and so called "dry-band arcing" may occur which can cause severe damage to the cable.

It is possible to overcome the problem of dry-band arcing by providing the optical cable with a longitudinally extruding electrically conductive path. However, an optical cable having such a longitudinally continuous electrically conductive path has the disadvantage that it cannot be installed safely between towers of an overhead electric power transmissions line that is on load in view of the danger of it touching one of the transmission lines; moreover, it is not always possible or desirable to interrupt the electrical power transmitted by the overhead electric power transmission line for a time sufficient to enable such an optical cable to be installed.

It is an object of the present invention to provide an improved method of installing in an overhead power transmission line which is on load an optical cable which has an overall protective sheath of electrically insulating material and which has, extending throughout substantially the whole of its length, at least one longitudinally continuous path sufficiently electrically conductive to carry along the cable any currents that may be capacitively induced.

According to the invention, the improved method comprises supporting an optical cable, which has an overall protective sheath of electrically insulating material, in long lengths between towers, employed to support at least one electric power transmission line which is on load and, after the optical cable has been so installed and whilst the overhead electric power transmission line is on load, providing on or in the supported optical cable at least one longitudinally continuous path which extends throughout substantially the whole length of the supported optical cable and which is sufficiently electrically conductive to carry along the cable any currents that may be capacitively induced.

During installation of the optical cable, the optical cable may also be suspended at least one position intermediate of its ends by a tower support employed to support the overhead electric power transmission line.

Preferably, but not necessarily, at each end of the supported optical cable and, if desired, at one or more than one of said intermediate positions at which the optical cable is suspended from a tower the or each longitudinally continuous electrically conductive path on or in the optical cable is directly or indirectly electrically (e.g. capacitively) connected to the tower, mast, or other upstanding support to which the optical cable is secured or from which the optical cable is suspended.

As stated above, the longitudinally continuous path is sufficiently electrically conductive to carry along the cable any currents that may be capacitively induced. The path may have any resistance within a wide range, for example up to 10 Mohm $m^{-1}$, although if a very high resistance path is employed there may be a danger of overheating of the path by the joule heating effect, and so the path preferably has a resistance of up to 1 Mohm $m^{-1}$. Normally, however, the path will be considerably more conductive, having a resistance of not more than 10, especially not more than 0.1 ohm $m^{-1}$.

Preferably the electrically conductive path is stretchable in order to prevent it cutting into, and damaging, the optical cable.

Where a longitudinally continuous electrically conductive path is to be provided on the supported optical cable, preferably a flexible element, e.g. a wire, of electrically conductive metal or metal alloy or of carbon or a carbon-based composite may be helically wound around the supported optical cable. In one method, the flexible element which is helically wound around the supported optical cable is of a composite form and comprises a flexible tube in which is loosely housed throughout the length of the tube a wire of electrically conductive metal or metal alloy or of carbon or a carbon-based composite, the wire having an overall length greater than that of the tube; this alternative method has the important advantage mentioned above that, when the supported optical cable is in service and is caused to stretch due to wind or ice loading, the risk that a wire constituting the helically wound flexible element will cut into the cable sheath is substantially reduced. In another alternative method, a flexible element of electrically conductive metal or metal alloy is arranged to lie substantially parallel to and in longitudinally continuous contact with the outer surface of the supported cable and is secured to the supported cable by a helically wound lashing or by longitudinally spaced clips or other longitudinally spaced fastening means. The flexible element or lashing preferably is helically wound around the supported cable using a known form of self-propelled winding machine which will travel along the supported cable and wind the flexible element or lashing therearound.

A particularly preferred conductive path according to the invention comprises an extruded length of an elastomer around which one,or more elongate conductors have been wound, for example by braiding. This form of conductive path is resiliently stretchable. The pitch of the windings of the conductors increases and the winding radius decreases as the conductive path is stretched, while the resilient nature of the elastomer will cause the conductors to return to their original shape when the conductive path is relaxed.

Where a longitudinally continuous electrically conductive path is to be provided in the supported optical cable, preferably a flexible element of electrically conductive metal or metal alloy is accommodated throughout the length of at least one longitudinally continuous bore or other passage within the supported cable by introducing a leading end of the length of flexible element into an end of the bore or other passage and by propelling the flexible element along the bore or passage of the supported cable by fluid drag of a gaseous medium which is passed through the bore or passage in the desired direction of advance at such a pressure that the length of flexible element is carried along the bore or passage until the length of flexible element is loosely housed in and throughout the length of said bore or passage of the supported cable.

The invention also includes an overhead optical transmission system in which the or each optical cable has been installed by the improved method hereinbefore described.

Two methods according to the invention will now be described by way of example, with reference to the accompanying drawings, in which:

FIG. 4 is a schematic view of a conventional optical cable on which a dry band has formed;

FIG. 5 is a schematic view of a section of cable formed according to one method according to the present invention.

Figure 1:
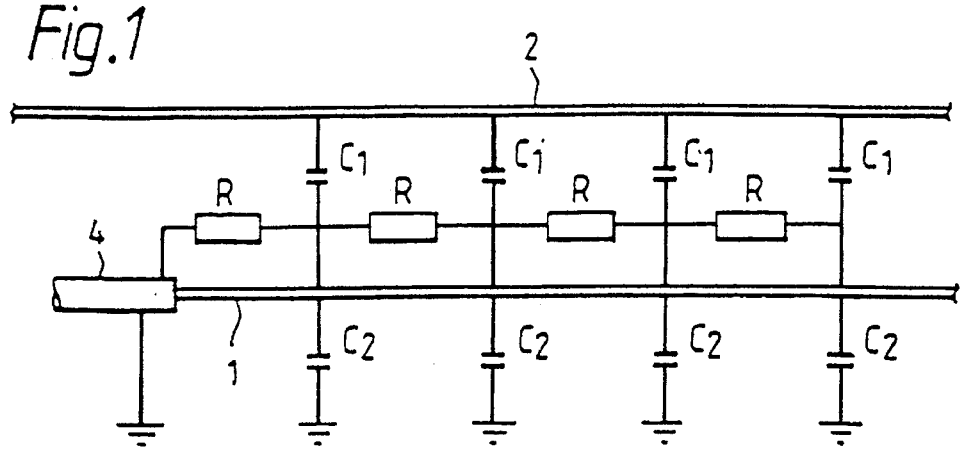
FIG. 1 is a schematic diagram of an optical cable and electric power line indicating the distributed capacitances.

Referring to the accompanying drawings, FIG. 1 illustrates a conventional "all dielectric self-supporting" (ADSS) optical cable 1 that is supported between a pair of towers that are also employed to support an electric power cable 2. The ADSS cable 1 is supported at the tower by means of a metallic clamp or fitting 4 which is earthed by means of the tower. In this system there is a distributed capacitance between the optical cable 1 and the power cable 2, indicated by lumped capacitances $C_1$, and a distributed capacitance between the optical cable 1 and ground, indicated by lumped capacitances $C_2$. In addition the cable has a large but finite longitudinal resistance indicated by lumped resistances R.

Figure 2:
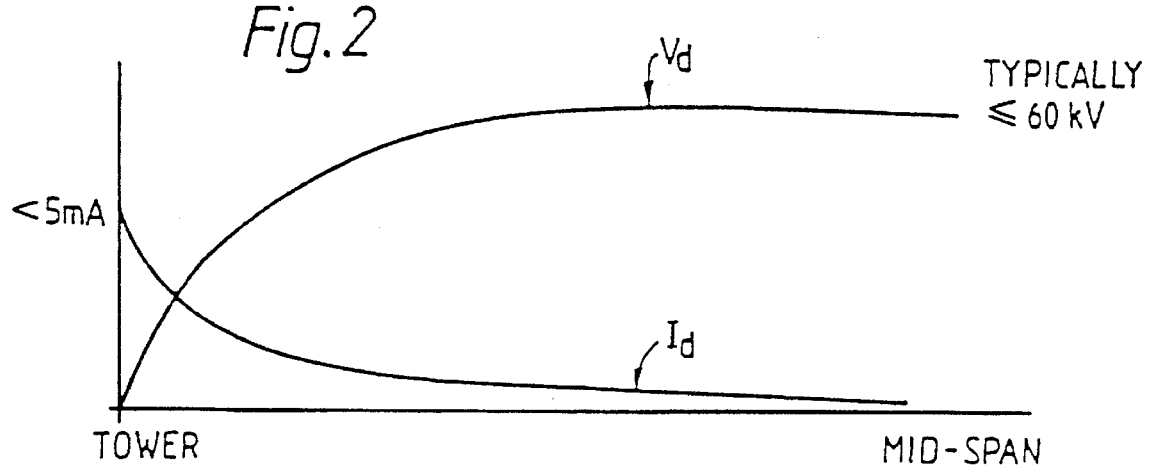
FIG. 2 is a graphical representation of the induced voltage and current on the optical cable in dry conditions.
Figure 3:
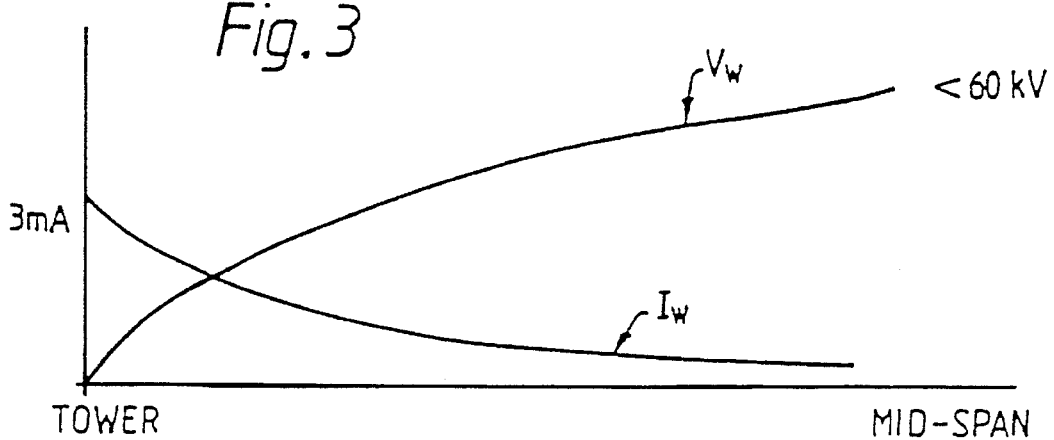
FIG. 3 is a graphical representation of the induced voltage and current on the optical cable in wet conditions.

Under dry conditions induced voltages ($V_d$) and currents ($I_d$) occur on the cable as shown in FIG. 2. The induced voltage is highest at mid-span, typically reaching a value of up to 60 kV on a 400 kV line, and is clearly at earth potential at the tower, while the current will be at a maximum at the tower, for example having a value of up to 5 microamps. Under wet conditions the longitudinal resistance of the optical cable is considerably lower, with the result that the maximum voltage ($V_w$) on the optical cable is lower but the induced current ($I_w$) has risen considerably to a typical value of 1 to 10 mA, as shown in FIG. 3.

Under these conditions, as shown in FIG. 4, a dry hand 6 of typical length 60 mm may form on the cable 1 in the region of the clamp 4 at the tower, due to joule heating of the surface water on the cable. This has the result that almost the entire induced voltage is dropped across this length of cable, and arcing may occur at this point with consequent damage to the cable jacket.

FIG. 5 shows a short section of an "All Dielectric Self Supporting" (ADSS) optical fibre cable 1 that has been formed by a preferred method according to the present invention. The optical cable 1 comprises a number of optical fibres (not shown) being suitable for transmission of light having a wavelength within the range of 0.8 to 2.1 micrometres and is suspended between towers at which points it is grounded. A conductive path has been provided along the length of the ADSS cable 1 by winding an elongate conductive element 11 around the cable in known manner using a conventional winding machine, while the phase conductors, also carried by the towers, remain on load.

The conductive element 11 comprises an insulating silicone elastomer core 12 of 2 mm diameter on which a braid has been formed from eight stainless steel wires 13 of diameter approximately 0.25mm. The braiding pitch is about 10 mm and the element is stranded on to the ADSS cable 1 with a pitch of about 75 mm. The elongate conductive element 11 as a whole is relatively resiliently stretchable, having a lower modulus of elasticity than that of the ADSS cable 1, since the braid can stretch in the longitudinal direction by increasing its pitch. As the elongate conductive element 11 is stretched, for example due to ice on the cable, the braided wires 13 "bed down" on the elastomeric core 12, and when the tensile force is removed, the natural resilience of the core 12 will force the braided wires 13 back to their original position. By this design of conductive element 11, damage to the ADSS cable 1 by the element 11 is prevented when the whole assembly is stretched.

Figure 6:
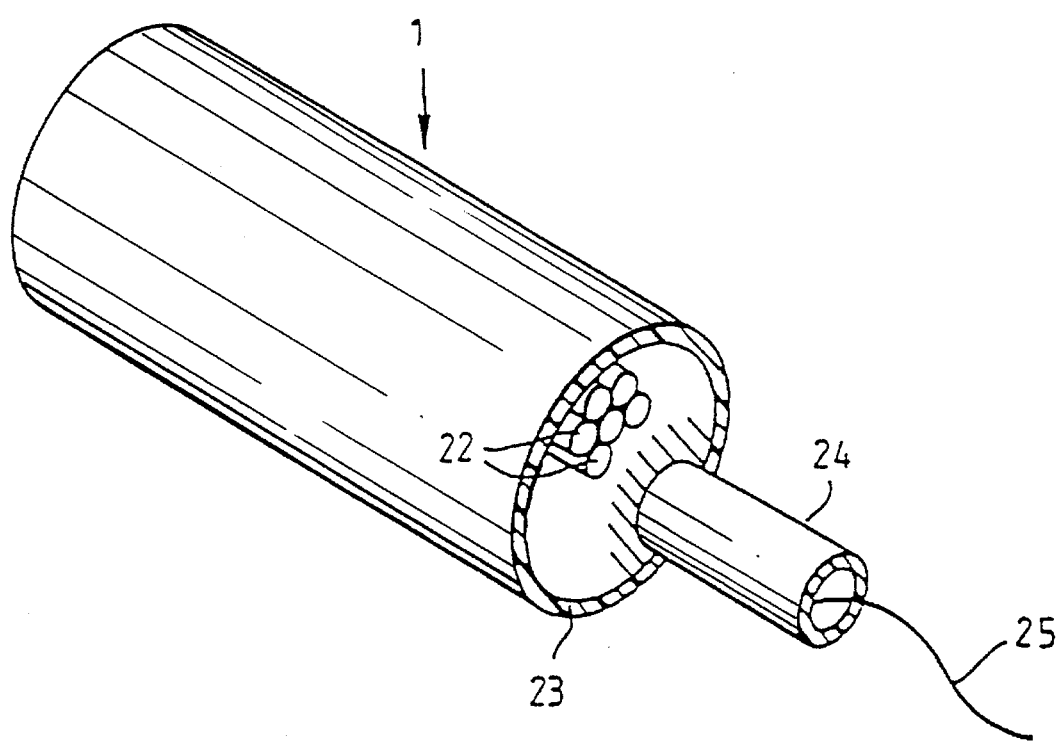
FIG. 6 is a schematic view of a section of cable formed according to another method according to the invention.

FIG. 6 shows a section of an alternative form of optical cable 1 comprising a number of optical fibres 22 or optical fibres bundles, and a cable jacket 23. A hollow tube 24 is located offset from the axis of the cable 1 and preferably adjacent to the cable jacket 23. When the optical cable has been installed on the towers by conventional means a conductor, e.g. a metallic wire 25 is introduced into the hollow tube 24 and loosely housed therein so that it undulates along its length in the tube 24 along its length in order to accommodate any change in length of the cable due to stretching. The wire 25 is introduced into the tube 24 by blowing it in. In such a procedure a leading edge of the wire is introduced into the tube 24 and the wire is propelled along the tube by fluid drag of a gaseous medium.

Although the wire 25 is not directly grounded to the towers, it is capacitively coupled to the towers via the optical cable clamp or other fittings which extend around the cable typically for a meter or more.

We claim:

1. A method of installing an optical cable in an overhead power transmission line which comprises supporting an optical cable, which has an overall protective sheath of electrically insulating material, in long lengths between towers employed to support at least one electric power transmission line which is on load and, after the optical cable has been so installed and while the overhead electric power transmission line is on load, providing said optical cable with at least one longitudinally continuous path which extends throughout substantially the whole length of the supported optical cable and which is sufficiently electrically conductive to carry along the cable any currents that may be capacitively induced.

2. A method as claimed in claim 1, wherein the optical cable is suspended at least one position intermediate of its ends by a tower employed to support the overhead electric power line.

3. A method as claimed in claim 2 wherein the electrically conductive path is directly or indirectly connected to the or each tower.

4. A method as claimed in claim 3 wherein the electrically conductive path is provided by winding an electrically conductive flexible element helically around the optical cable.

5. A method as claimed in claim 4 wherein the electrically conductive flexible element comprises a flexible tube in which is loosely housed throughout its length a wire of metal or metal alloy or of carbon or carbon-based composite, the wire having an overall length greater than that of the tube.

6. A method as claimed in claim 3 wherein a flexible element of a metal or metal alloy is accommodated throughout the length of at least one longitudinally continuous bore or other passage within the cable by introducing a leading end of the length of flexible element into an end of the bore or other passage and by propelling the flexible element along the bore or other passage by fluid drag of a gaseous medium which is passed through the bore or passage in the desired direction of advance at such a pressure that the length of flexible element is carried along the bore or passage until the length of flexible element is loosely housed in and throughout the length of said bore or passage of the supported cable.

7. A method as claimed in claim 3 wherein the electrically conductive path comprises an extruded length of an elastomer around which one or more elongate conductors have been wound.

8. A method as claimed in claim 2 wherein the electrically conductive path is provided by winding an electrically conductive flexible element helically around the optical cable.

9. A method as claimed in claim 8 wherein the electrically conductive flexible element comprises a flexible tube in which is loosely housed throughout its length a wire of metal or metal alloy or of carbon or carbon-based composite, the wire having an overall length greater than that of the tube.

10. A method as claimed in claim 8 wherein the electrically conductive path comprises an extruded length of an elastomer around which one or more elongate conductors have been wound.

11. A method as claimed in claim 2 wherein a flexible element of a metal or metal alloy is accommodated throughout the length of at least one longitudinally continuous bore or other passage within the cable by introducing a leading end of the length of flexible element into an end of the bore or other passage and by propelling the flexible element along the bore or other passage by fluid drag of a gaseous medium which is passed through the bore or passage in the desired direction of advance at such a pressure that the length of flexible element is carried along the bore or passage until the length of flexible element is loosely housed in and throughout the length of said bore or passage of the supported cable.

12. A method as claimed in claim 2 wherein the electrically conductive path comprises an extruded length of an elastomer around which one or more elongate conductors have been wound.

13. A method as claimed in claim 12, wherein a plurality of elongate conductors have been braided on to the extruded length of the elastomer.

14. A method as claimed in claim 1 wherein the electrically conductive path is directly or indirectly connected to the or each tower.

15. A method as claimed in claim 14 wherein the electrically conductive path is provided by winding an electrically conductive flexible element helically around the optical cable.

16. A method as claimed in claim 15 wherein the electrically conductive flexible element comprises a flexible tube in which is loosely housed throughout its length a wire of metal or metal alloy or of carbon or carbon-based composite, the wire having an overall length greater than that of the tube.

17. A method as claimed in claim 14 wherein a flexible element of a metal or metal alloy is accommodated throughout the length of at least one longitudinally continuous bore or other passage within the cable by introducing a leading end of the length of flexible element into an end of the bore or other passage and by propelling the flexible element along the bore or other passage by fluid drag of a gaseous medium which is passed through the bore or passage in the desired direction of advance at such a pressure that the length of flexible element is carried along the bore or passage until the length of flexible element is loosely housed in and throughout the length of said bore or passage of the supported cable.

18. A method as claimed in claim 14 wherein the electrically conductive path comprises an extruded length of an elastomer around which one or more elongate conductors have been wound.

19. A method as claimed in claim 18, wherein a plurality of elongate conductors have been braided on to the extruded length of the elastomer.

20. A method as claimed in claim 1 wherein the electrically conductive path is provided by winding an electrically conductive flexible element helically around the optical cable.

21. A method as claimed in claim 20, wherein the electrically conductive flexible element comprises a flexible tube in which is loosely housed throughout its length a wire of metal or metal alloy or of carbon or carbon-based composite, the wire having an overall length greater than that of the tube.

22. A method as claimed in claim 20 wherein the electrically conductive path comprises an extruded length of an elastomer around which one or more elongate conductors have been wound.

23. A method as claimed in claim 22, wherein a plurality of elongate conductors have been braided on to the extruded length of the elastomer.

24. A method as claimed in claim 1, wherein the electrically conductive path comprises an extruded length of an elastomer around which one or more elongate conductors have been wound.

25. A method as claimed in claim 24, wherein a plurality of elongate conductors have been braided on to the extruded length of elastomer.

26. A method as claimed in claim 1, wherein a flexible element of a metal or metal alloy is accommodated throughout the length of at least one longitudinally continuous bore or other passage within the cable by introducing a leading end of the length of flexible element into an end of the bore or other passage and by propelling the flexible element along the bore or other passage by fluid drag of a gaseous medium which is passed through the bore or passage in the desired direction of advance at such a pressure that the length of flexible element is carried along the bore or passage until the length of flexible element is loosely housed in and throughout the length of said bore or passage of the supported cable.

* * * * *